United States Patent [19]

Rowney et al.

[11] Patent Number: 5,710,726
[45] Date of Patent: Jan. 20, 1998

[54] SEMI-COMPOSITIONAL SIMULATION OF HYDROCARBON RESERVOIRS

[75] Inventors: John D. Rowney, Plano; Michael D. Clonts, Dallas, both of Tex.

[73] Assignee: Atlantic Richfield Company, Los Angeles, Calif.

[21] Appl. No.: 541,778

[22] Filed: Oct. 10, 1995

[51] Int. Cl.$^6$ .................................................. G06T 17/50
[52] U.S. Cl. .................................................. 364/578
[58] Field of Search ........................ 395/500; 364/578, 364/421, 420; 166/250.01

[56] References Cited

U.S. PATENT DOCUMENTS

| | | | |
|---|---|---|---|
| 4,273,187 | 6/1981 | Satter et al. | 166/250.01 |
| 4,821,164 | 4/1989 | Swanson | 364/420 |
| 4,991,095 | 2/1991 | Swanson | 364/421 |
| 5,321,612 | 6/1994 | Stewart | 364/420 |

OTHER PUBLICATIONS

Coats, "Reservoir Simulation: State of the Art", *Journal of Petroleum Technology*, (Society of Petroleum Engineers, 1982), pp. 1633–1642.

*Primary Examiner*—Kevin J. Teska
*Assistant Examiner*—Dan Fiul
*Attorney, Agent, or Firm*—Anderson, Levine & Lintel

[57] ABSTRACT

A computer-operated method and corresponding system for simulating a reservoir to provide inputs to a surface model simulation is disclosed. The method of operating the simulation begins with the dividing of the reservoir into volume cells, and assigning reservoir parameters such as porosity and permeability of the rock to the particular cells. Temperature and pressure values are also assigned to each of the volume cells, and an equation of state is solved for the cells to determine densities of each of the components of the contents of the reservoirs, examples of such components including methane, ethane, and the like. A black oil simulation of the reservoir is then performed over a time step, to determine the fluxes of the vapor and liquid phases, as reservoir barrel volumes, at each cell boundary. The assigned density values are then used to transform the volumes determined by the black oil simulation to molar quantities for each component. One or more volume cell boundaries correspond to the well output, so that the transformation provides output quantities of the components from the reservoir over the time step; one or more volume cell boundaries may also correspond to injection sites. The method provides an efficient way of providing component mass quantities to downstream simulations, such as surface model simulations.

19 Claims, 4 Drawing Sheets

SEMI-COMPOSITIONAL SIMULATION OF HYDROCARBON RESERVOIRS

This invention is in the field of oil and gas production, and is more specifically directed to the simulation of the output of producing hydrocarbon reservoirs.

BACKGROUND OF THE INVENTION

In the field of oil and gas production, the simulation of the behavior of producing hydrocarbon reservoirs is commonly performed in order to predict reservoir performance. These predictions of reservoir performance are of course useful in preparing economic forecasts of the recovery of oil and gas from the reservoir. In addition, reservoir simulation can be used in the design and selection of enhanced oil recovery (EOR) techniques, primarily by providing comparisons of the production effects of candidate secondary and tertiary recovery operations.

Conventional reservoir simulation techniques generally operate, in the three-dimensional case, by subdividing the reservoir volume into a grid of incremental volume elements; of course, 2-D and 1-D simulations may also be performed, in which the incremental elements are of cross-sectional area or linear position, respectively. A survey article of reservoir simulation techniques is provided by Coats, "Reservoir Simulation: State of the Art", *J. Pet. Tech.* (August 1982, Society of Petroleum Engineers), pp. 1633–42. These simulations determine the flow of the various components of reservoir contents among the grid positions (i.e., the incremental volume elements). Many conventional reservoir simulations address the reservoir components merely as phases. Two-phase simulations simulate the reservoir as a gas/water problem, and thus simulate the recovery of gas product only. The well-known "black oil" reservoir simulation technique solves a three component problem, addressing the three components of oil, gas and water in the reservoir and simulating their relative flow components among the incremental volume elements of the reservoir grid according to a material balance approach. In each of these techniques, the simulation proceeds over a time window in which the flow of one or more of the phases out of the reservoir is simulated, either with or without simulating the injection of water or gas into the reservoir (as a secondary recovery technique).

The black oil simulation technique is now commonly applied to complex reservoir problems. Inputs to the simulation include the geometry of the reservoir, selection of the size of the incremental grid elements, permeability and porosity values for the incremental elements (which may or may not be uniform throughout the reservoir volume), and other parameters relating to reservoir and fluid properties such as pressure, temperature and composition of the incremental elements. Complex structures such as faults, injection wells, and production wells may also be placed within the simulated reservoir geometry. Given these inputs, the simulation then follows the well-known volumetric material balance equations and Darcy's law modified by the relative permeability concept in determining the flow rates (flux) of each of the gas, water, and oil between each pair of adjacent grid elements over an incremental time window. The output from the producing location is also considered as a boundary of a grid element, so that the flux from this boundary corresponds to the production from the reservoir for the simulated conditions over the incremental time window.

The black oil simulation technique has proven to be very useful in providing accurate simulations of the behavior of producing hydrocarbon reservoirs, at relatively modest computational complexity. However, this simulation technique is limited to the three components of gas, oil and water, and is not capable of simulating the behavior of the various compositional components of each. Specifically, the gas and oil contained within a typical hydrocarbon reservoir is made up of numerous components, including methane, ethane, propane, and heavier hydrocarbon components, as well as non-hydrocarbon components such as carbon dioxide and nitrogen, each of which have different densities and thus which are present in varying quantities over the volume of the reservoir. Simulation of the flux and quantities of these various components is often useful to the producer, especially at producing locations where substantial processing is also taking place.

For example, some production locations, particularly remote locations at which natural gas is being recovered (and thus which are remote from natural gas distribution pipelines), have the capability of separating natural gas liquids ("NGLs") from the reservoir output, producing miscible injectants, recovering condensates, and separating the remaining natural gas (e.g., for pipeline transmission or for reinjection into the reservoir) from the oil product and from locally used fuel. It is, of course, useful to simulate the output of the surface processing station (such simulation generally referred to as the "surface model" simulation), considering that the economic benefit of the production is most closely related to the types and quantities of products from the surface processing station. However, the output quantities from the surface processing station are dependent upon the composition of the oil and gas output of the reservoir, and not merely upon the quantities of the oil and gas phases. Accordingly, surface model simulation of the quantities of the specific products of NGLs, miscible injectants, and the like produced by the surface processing station requires the composition of the gas and oil (i.e., the molar quantities of the component gases) as inputs to the simulation. The number of these inputs may be quite sizable, for example up to as many as twenty individual components. The black oil simulation, by itself, is therefore incapable of providing the input quantities required by the surface model.

Heretofore, the appropriate inputs have been provided to the surface model primarily by applying certain assumptions to the results of the black oil simulation. For example, gas analysis of the output of the reservoir will provide a determination of the quantities of the various components within the gas; these assumptions have been used, in combination with the results of the black oil simulation, to provide an estimate of the composition of the gas components presented to the surface model. However, if conditions in the reservoir change, these assumptions of the gas composition likely will no longer hold, and the inputs to the surface model based upon the black oil simulation will accordingly be incorrect, resulting in incorrect surface model simulation.

Fully compositional reservoir modeling techniques are also known. According to these techniques, each component of the gas and oil is individually modeled in each incremental volume element of the reservoir over each incremental time period, generally by the application of an equation of state. As may be expected, considering the number of components to be modeled and also considering the complexity of the flow mechanics within typical reservoirs, a fully compositional reservoir modeling approach is extremely complex in setting up the simulation conditions (i.e., defining the reservoir and fluid properties of the incremental grid elements), and also involves a high degree of computational complexity to ensure equilibrium at each incremental time. Furthermore, considering that the reservoir may be modeled by several thousands of volume elements, over thousands of time steps (for example, each time step may represent a week, with the overall time period of the simulation representing fifty or sixty years), the computer memory requirements for fully-compositional modeling will also be excessively high. This approach thus involves significant development expense, sizable computing cost, and long run times.

It is therefore an object of the present invention to provide a method and system for performing a reservoir simulation that provides the inputs required by complex surface model.

It is a further object of the present invention to provide such a method and system which may be efficiently implemented into and performed by conventional desktop workstations.

It is a further object of the present invention to provide such a method and system which provides a high degree of accuracy in the reservoir modeling of the composition of the gas and oil output.

It is a further object of the present invention to provide such a method and system which may be integrated into and with the surface model simulation.

Other objects and advantages of the present invention will be apparent to those of ordinary skill in the art having reference to the following specification together with its drawings.

SUMMARY OF THE INVENTION

The invention may be implemented as a computer program operable by a desktop computer workstation. The simulated reservoir is defined three-dimensionally as a number of incremental volume elements adjacent to one another at boundaries; one or more injection locations may be included and are also considered as boundaries, as are the production well locations. According to the present invention, black oil modeling determines the volume flux of each phase of oil, gas and water, across each boundary between incremental volume elements in the modeled reservoir, over an incremental time step. Upon determining the volume flux across each boundary (e.g., as reservoir barrels), each volume flux is converted to moles of each of the components required by the surface model simulation (e.g., methane, ethane, etc.). This conversion is made using component densities provided by an equation-of-state, such as the Peng-Robinson equation of state, applied to each volume element. Following the conversion of the fluxes from volume to moles, an accounting procedure is performed in order to ensure consistency within the model (i.e., ensuring that nonsensical volumes and masses are not derived). The process is then repeated for the next incremental time window, and continues over the simulation time period.

DETAILED DESCRIPTION OF THE DRAWINGS

DETAILED DESCRIPTION OF THE PREFERRED EMBODIMENT

Figure 1:
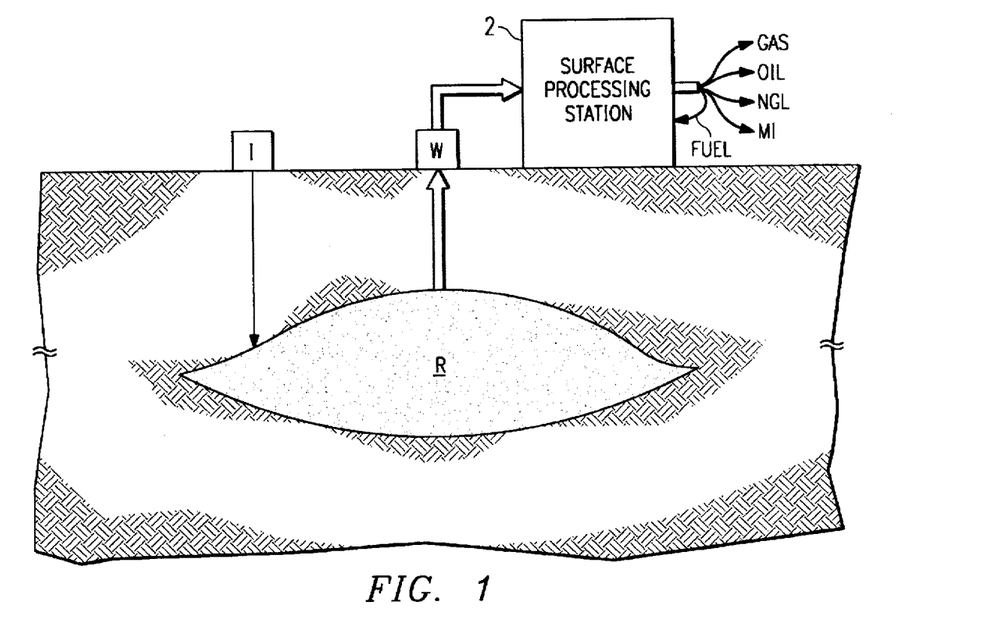
FIG. 1 is a cross-sectional view of a portion of the earth, schematically illustrating a producing reservoir in combination with a surface processing unit.

Referring now to FIG. 1, a cross-sectional view of a portion of the earth containing a hydrocarbon reservoir is illustrated, for purposes of explaining the operation and benefits of the preferred embodiments of the invention. The schematic illustration of FIG. 1 is a simplified representation of a typical production region of the earth, at which reservoir R is located; in this example, reservoir R is a subsurface region of porous rock within the earth bearing gas, oil and water in a pressurized condition. Well W is located at the surface of the earth, from which production quantities of oil and gas are being produced. In the simplified example of FIG. 1, injection site I is also provided, at which water or another conventional substance used in enhanced oil recovery (EOR) techniques (also referred to as secondary processing) is injected into reservoir R; in some locations where commercial gas pipelines are not available, gas may be re-injected into reservoir R.

The output of well W is presented to surface processing station 2. Conventional surface processing stations range widely in their processing capabilities. Simple surface processing stations may merely separate the oil from the gas (and from any water which may also be produced), forward the separated oil to a pipeline or storage unit, and forward the gas to a gas pipeline or for re-injection. In the example of FIG. 1, in which the present invention is particularly useful, surface processing station 2 performs not only simple separation, but produces other hydrocarbon products, including natural gas liquids (NGLs), miscible injectants (MI) for use in the EOR from reservoir R or from other reservoirs in the region, and fuel for use locally at or near surface processing station 2.

Figure 2:
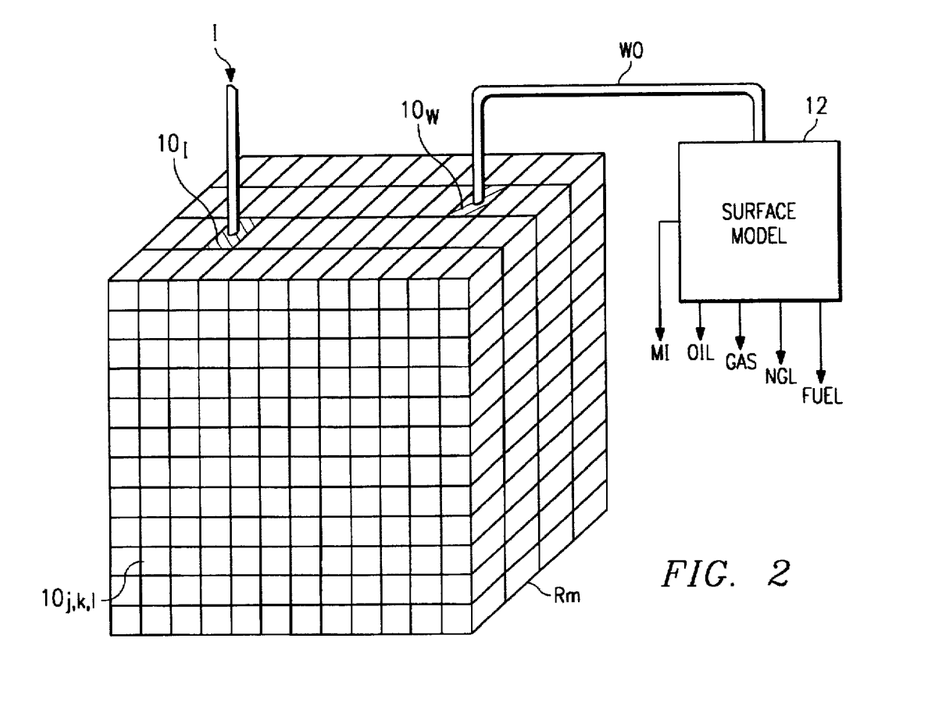
FIG. 2 is a schematic block diagram illustrating the relationship of the models utilized according to the preferred embodiment of the invention.

Reservoir R and surface processing station 2 of FIG. 1 may be modeled in the configuration illustrated in FIG. 2. As shown in FIG. 2, reservoir model $R_m$ represents a three-dimensional model of reservoir R of FIG. 1; of course, one-dimensional or two-dimensional reservoir models may alternatively be used. Model $R_m$ treats reservoir R as a group of incremental volume elements, or volume cells, 10 that make up the volume of reservoir R, with each volume cell 10 having a unique position in the model. For example, volume cell $10_{j,k,l}$ refers to volume cell 10 that is in the jth position in the x-dimension, the kth position in the y-dimension, and the lth position in the z-dimension. Each volume cell position corresponds to an incremental volume position within reservoir R, and as such model $R_m$ will have volume cells 10 that are capable of containing non-zero representations of oil, gas and water components in a shape corresponding to the known shape and geometry of reservoir R. It is contemplated that reservoir model $R_m$ will have on the order of thousands or tens of thousands of volume cells 10 in a typical implementation.

As will be described in further detail hereinbelow, the modeling process according to the preferred embodiment of the invention determines the flow of gas, oil and water across the boundaries between cells. As such, well W of FIG. 1 is modeled by the boundary of the volume cell $10_w$ corresponding to the location of reservoir R contacted by well W; similarly, injection site I is modeled by the boundary of volume cell $10_I$ corresponding to the location of reservoir R contacted by injection site I. The output of well W is presented, in the model of FIG. 2, by well output quantities WO that are presented to a surface model 12. Surface model 12, as is known in the art, is a model of the operation of surface processing station 2 of FIG. 1, and thus receives well output quantities WO from reservoir $R_m$ as inputs, and generates modeled output quantities for oil, gas, NGLs, and fuel. In addition, surface model 12 generates a modeled output quantity of miscible injectants MI.

As is known in the art, in order to generate the output quantities of NGLs and MIs, and also the remaining output quantities and composition of gas and oil, surface model 12 requires, as inputs, the quantities of specific chemical components provided from reservoir model $R_m$, and not merely the quantities of the gas, oil and water phases that is generally provided (in units of reservoir barrels, for example) by conventional "black oil" reservoir models. According to the preferred embodiment of the invention, the reservoir model $R_m$ presents well output quantities WO to surface model 12, as molar quantities of those chemical components contained within reservoir 10 that are to be used in surface model 12, including components such as methane, ethane, propane, and the like. Preferably, reservoir model $R_m$ and surface model 12 are implemented in a unified manner so as to operate together. The unification of reservoir model $R_m$ with surface model 12 also allows direct passing of the output quantities WO from reservoir model $R_m$ to surface model 12, without requiring reservoir model $R_m$ to write its results to a file that are subsequently accessed by a separate run of the surface model 12 for the same time step.

Figure 3:
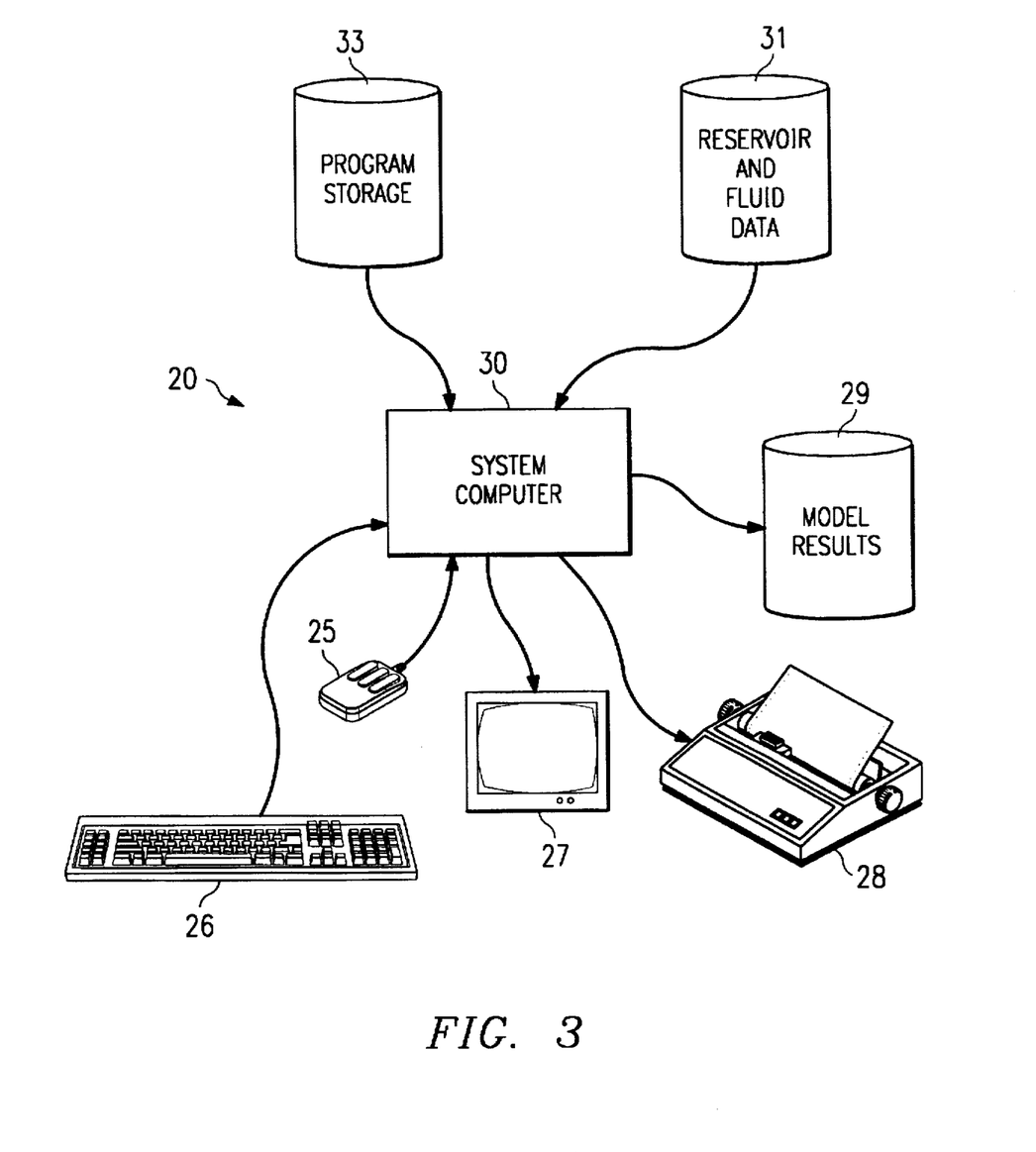
FIG. 3 is an electrical diagram, in block form, of a computer system upon which the preferred embodiment of the invention is implemented.

Referring now to FIG. 3, computer system 20 which may be used to perform the method described in further detail hereinbelow according to the preferred embodiment of the invention will now be described in detail. As shown in FIG. 3, this system includes system computer 30, which may be implemented as any conventional personal computer or workstation, such as a RISC-based computer workstation, implemented either in standalone fashion or as part of a network arrangement. System computer 30 is in communication with disk storage devices 29, 31 and 33. It is contemplated that disk storage devices 29, 31, 33 are conventional hard disk drives, implemented locally with system computer 30, by way of a local area network or by remote access. Of course, while disk storage devices 29, 31, 33 are illustrated as separate devices, a single disk storage device may of course be used to store any and all of the program instructions, modeling data, and results as desired.

In this embodiment of the invention, measurement data corresponding to the size, geometry, and reservoir parameters of reservoir R, as well as known fluid parameters for the constituents of the contents of reservoir R, are stored on disk storage device 31, from which system computer 30 may retrieve the appropriate data to perform the method described hereinbelow under the control of a computer program instructions. In this example, the computer program instructions are written in the form of a computer program (e.g., in the Fortran language or in any other suitable language, and which may or may not be compiled), stored in computer-readable memory such as program disk storage device 33 of FIG. 3; of course, the memory medium storing the computer program may be of any conventional type used for the storage of computer programs, including hard disk drives, floppy disks, CD-ROM disks, magnetic tape, and the like.

According to the preferred embodiment of the invention, system computer 30 presents output primarily to disk storage 29 for later use in the generation of a report to be output via printer 28; alternatively, or in addition, system computer 30 may present the ongoing results of the modeling, for interactive use, via graphics display 27. Keyboard 26 and pointing device 25 (e.g., a mouse, trackball or the like) are provided with system computer to enable interactive operation. As noted, system computer 30 may either be located at a data center remote from reservoir R and surface processing station 2, or alternatively may be located on site thereat to provide analysis to the operators of the producing location.

Figure 4:
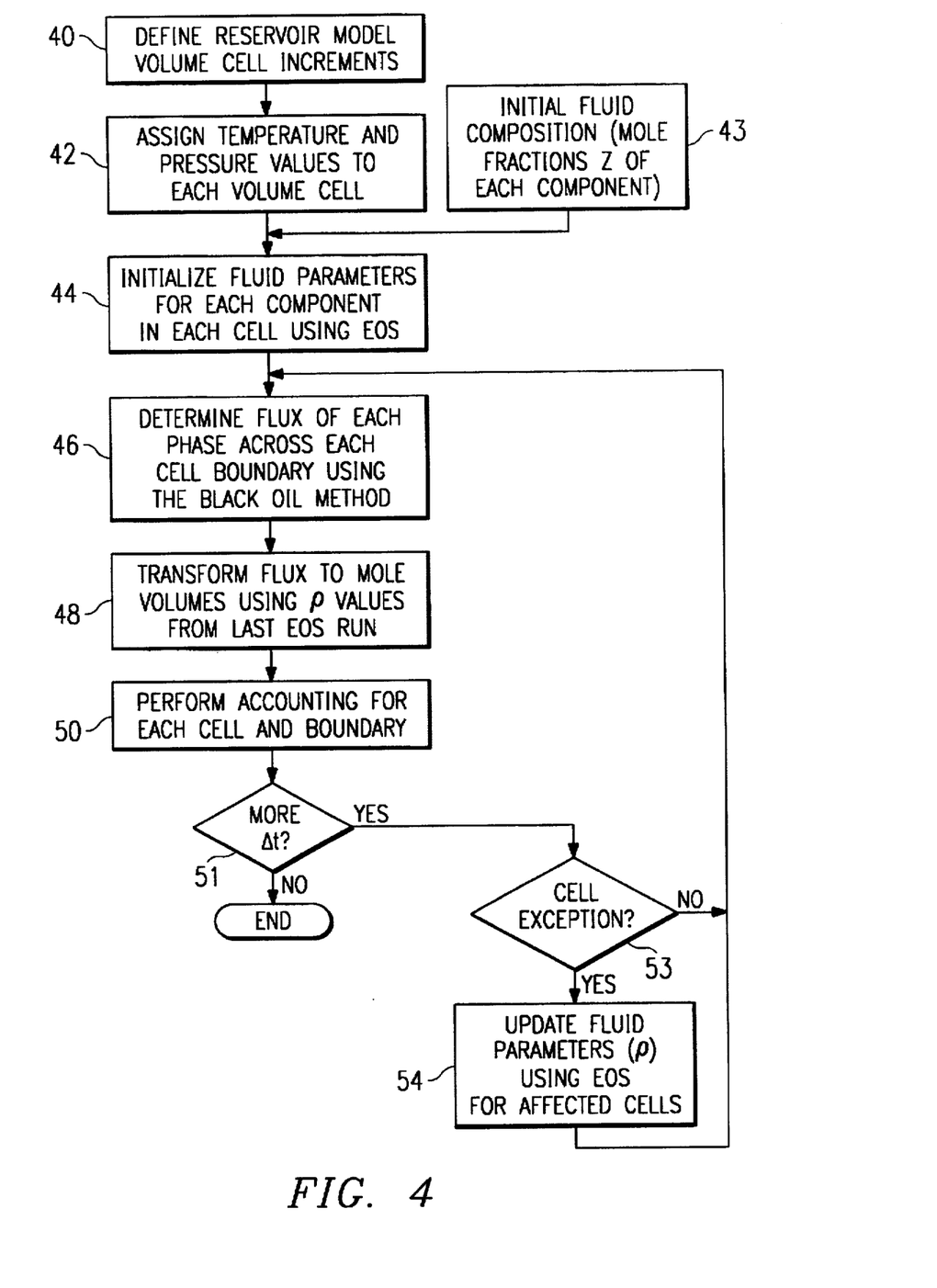
FIG. 4 is a flow chart illustrating the method of operation of the preferred embodiment of the invention.

Referring now to FIG. 4, a method of performing the simulation of reservoir R for use in surface model simulation according to the preferred embodiment of the invention will now be described in detail. By way of general introduction, the method according to the preferred embodiment of the invention utilizes the black oil simulation method to simulate and determine flows of phases (i.e., hydrocarbon liquid, hydrocarbon vapor, and aqueous liquid) among volume cells 10 of reservoir model $R_m$, using density values $\rho$ determined for each component that are derived from an equation of state. This is in contrast to fully-compositional modeling of reservoirs, which use the equation of state to determine not only the fluid properties (e.g., fluid densities $\rho$) but also the fluid flow within the reservoir; this method is also in contrast to the conventional black oil simulation technique which determines fluid flow within the reservoir and only simple (i.e., limited to phase) fluid properties. As a result, the method of the preferred embodiment of the invention is able to provide a full set of fluid properties for the individual hydrocarbon and non-hydrocarbon components in the reservoir with results that are very close approximations to that which would be obtained through use of the fully-compositional model, while obtaining the computing economies provided by the black oil simulation technique.

It should be noted that the method according to the preferred embodiment of the invention provides best results when applied to reservoirs that satisfy the "weakly" compositional assumption. As is known in the art, weakly compositional reservoirs are those in which there are no severe compositional changes within the reservoir. Many important known reservoirs meet this requirement, as is known in the art, and as such it is contemplated that the method according to the preferred embodiment of the invention will provide benefits in many locations.

According to this embodiment of the invention, the method begins with process 40, in which volume cells 10 are assigned to construct reservoir model $R_m$. Process 40 is performed by system computer 30 in the conventional manner for black oil reservoir simulation, and thus begins by retrieving reservoir information such as size, geometry, depth, locations of faults, porosity, water saturation, and other reservoir parameters, from disk storage device 31. System computer 30 then, preferably in response to inputs from the user, subdivides the geometric representation of reservoir R into volume cells 10, with the sizes (or number) of volume cells 10 selected by the user. Following definition of reservoir model $R_m$ as accomplished in process 40, system computer 30 then assigns the appropriate temperature and pressure values to each of volume cells 10, in process 42. As is rudimentary in the art, solution of an equation of state requires the pressure and temperature conditions for the particular volume element under consideration. Process 42 thus provides these inputs of pressure and temperature for each volume cell 10 in reservoir model $R_m$, based upon additional reservoir data retrieved from disk storage device 31. Similarly, process 43 assigns mole fractions $z_i$ to the components, in a manner consistent with the initial state of reservoir R.

Following the assignment of temperature and pressure values to each volume cell 10 in reservoir model $R_m$ as performed by process 42, reservoir model $R_m$ is ready for initialization relative to the chemical components of the phases contained in reservoir R. Process 44 then is performed by system computer 30 to initialize each volume cell 10 to define the volumes and densities of the fluids in place therewithin. According to this preferred embodiment of the invention, this initialization is performed by solving an equation of state, preferably of the cubic type, for each of the components of the fluids in place within each volume cell 10, using the temperature and pressure values assigned thereto in process 42, using the mole fractions z assigned to each component in process 43, and using the reservoir parameters retrieved in process 40. Several well-known cubic equations of state are suitable for use in process 40, including the Peng-Robinson and Redlich-Kwong equations of state. Specifically, process 44 determines the density of each of the component gases in each volume cell, based upon the temperature and pressure conditions therein, in the manner to be described hereinbelow.

Process 44 is performed based upon analysis of the upstream output from well W. According to well-known techniques, the compressibility factor, or deviation factor, Z, is first determined for each phase (vapor and liquid) from the output of well W. Based upon this deviation factor Z, the densities of the phase at the volume cell is readily determinable. By way of explanation, in the case of vapor, the deviation factor $Z^v$ may be determined for a volume cell 10, based on the upstream analysis, from the real gas law (which, of course, is a simple equation of state):

$$\rho^v [mol/RB] = P/(Z^v R_{10} T_{10})$$

where R is the gas constant, and where $P_{10}$ and $T_{10}$ are the pressure and temperatures of interest for a particular volume cell 10; the density value $\rho^v$ is expressed in the units of moles per reservoir barrel. The density value $\rho_l$ is similarly determined for the liquid hydrocarbon (oil) phase. The individual densities may then be determined by the solution of the selected equation of state, using the phase densities determined hereinabove and using the assigned mole fraction $z_j$ for each component j in the phase. By way of explanation, an individual component density $\rho_j$ is determined from the mole fraction $z_j$ for the individual component j and from the density value $\rho$ for the phase as follows:

$$\rho_j [mol/RB] = (z_j) \rho [mol/RB]$$

Of course, the actual individual densities $\rho_j$ for each of the j components of each phase (e.g., methane, ethane, propane, etc., for the gas phase) will be rigorously determined through solution of the applicable equation of state. Upon the determination of these density values $\rho_j$ for each of the components in each volume cell 10, process 44 determines the volume of each component in each volume cell 10, measured in reservoir barrels, based on the these densities, to provide consistency with the black off simulation to next be performed. Accordingly, upon completion of process 44, each volume cell 10 is initialized with a density value and a volume for each component contained therewithin.

Once reservoir model $R_m$ is initialized by process 44, process 46 is now performed by system computer 30 to model the flow of gases and liquids across each boundary between adjacent volume cells 10 over a time step $\Delta t$. Typically, the time step $\Delta t$ will correspond to a period of days over the life of reservoir R, for example one week. Process 46 uses the well-known black off simulation method to simulate the flux of each phase (i.e., vapor and liquid) across each boundary between adjacent volume cells 10. Volume cell boundaries simulated by process 46 include the boundaries at the output of well volume cell $10_w$ and also the input to injection volume cell $10_I$, to account for the output flow of oil and gas and the input flow of water or gas (as an injectant) into reservoir R.

Figure 5A:
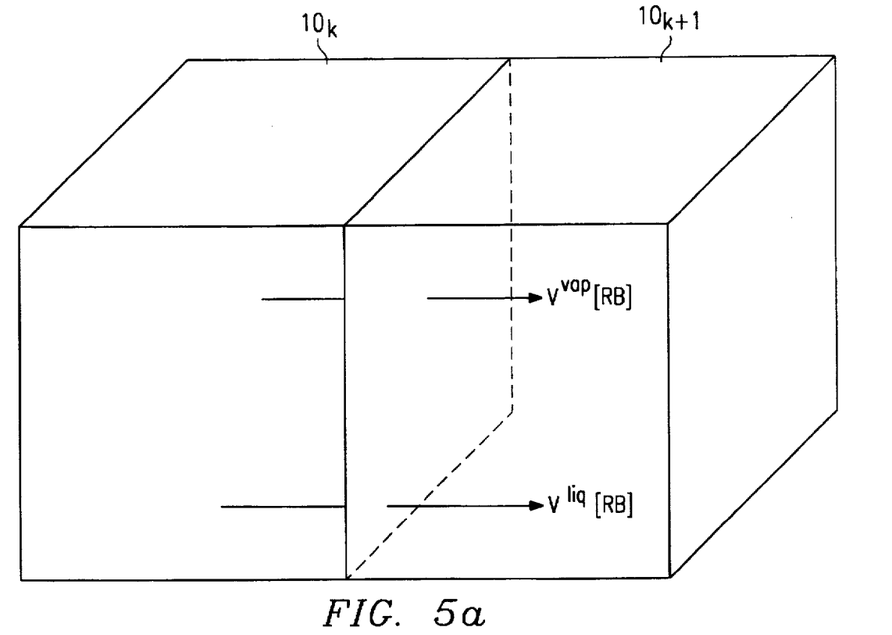
FIGS. 5a and 5b are schematic representations of volume cells in the reservoir simulation illustrating certain values calculated according to the preferred embodiment of the invention.

FIG. 5a provides, by way of a pictorial example, the results of process 46 at one boundary within reservoir model $R_m$, specifically between volume cell $10_k$ and volume cell $10_{k+1}$, illustrating the flows of the vapor and liquid phases therethrough over a time step $\Delta t$. FIG. 5a illustrates vapor flux $V^{vap}$ [RB], which corresponds to the flux, or volume, of all hydrocarbon vapor components moving from volume cell $10_k$ to volume cell $10_{k+1}$ during time step $\Delta t$, while liquid flux $V_{liq}$ [RB] corresponds to the flux of hydrocarbon liquids traveling from volume cell $10_k$ to volume cell $10_{k+1}$ during time step $\Delta t$. The aqueous phase is not considered, as it does not contribute to the hydrocarbon phase behavior, and indeed is not a component in the equation of state. As is known in the art, the black oil simulation technique determines the flow of phases in a way that conserves volume (i.e., monitors and tracks volumes), and as such the flows are expressed as reservoir barrels (RB).

Following process 46 for time step $\Delta t$, system computer 30 next performs process 48 in the method according to the preferred embodiment of the invention, to transform the flux volumes (reservoir barrels) into molar fluxes for each component. Examples of the components for the vapor phase include methane, ethane, propane, butane, and such other components as are required by surface model 12. The hydrocarbon liquid phase typically includes components such as hexane, heptane, octane, and other heavier hydrocarbon components, although all hydrocarbon components considered by the present invention may exist in either the vapor or liquid phase. Indeed, as is well known, the equation of state requires each component to be present in each of the vapor and liquid phases. The transformation of process 48 is performed individually, for each volume cell 10 in reservoir model $R_m$, by using the component density values $\rho_j$ determined individually for each volume cell 10 in the initialization process 44, based on the equation of state. The molar flux of the kth individual component is expressed as a mole number $N_k$ that is determined as follows (in the case where component k is a gas):

$$N_k [mol] = \rho_k [mol/RB] \times V^{vap} [RB]$$

Similarly, each liquid component also has a molar flux, or mole number, determined in process 48, according to a similar equation. For the mth liquid component, having a density $\rho_m$ determined in process 44, the mole number $N_m$ is determined as:

$$N_m [mol] = \rho_m [mol/RB] \times V^{liq} [RB]$$

Figure 5B:
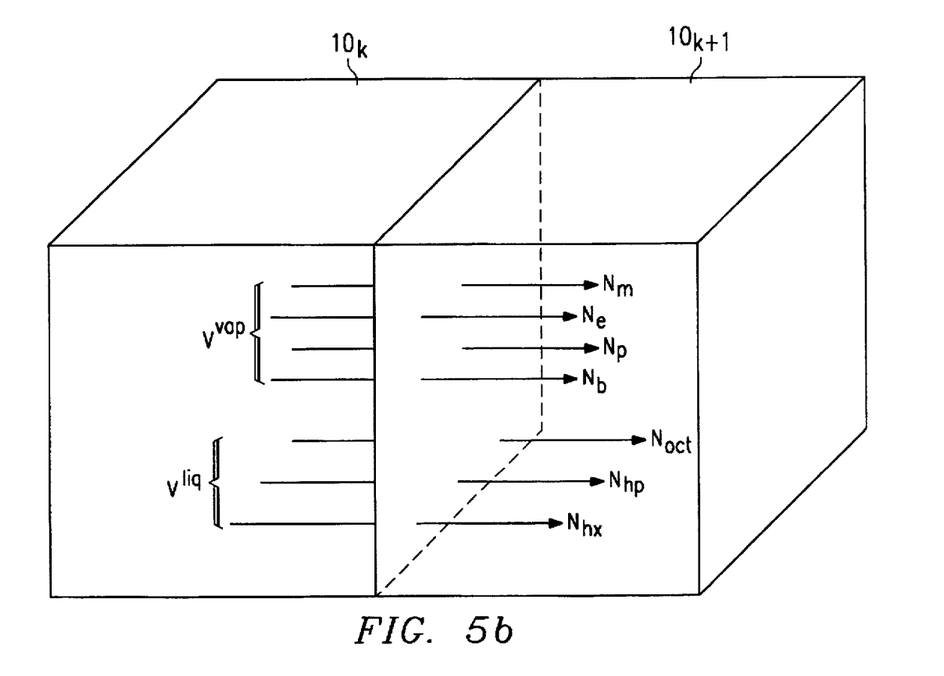

The results of process 48 are illustrated in FIG. 5b, in which the molar fluxes of each of the components are shown as the various mole numbers N. For example, the components of the gas phase include mole numbers $N_m$, $N_e$, $N_p$, $N_b$ for methane, ethane, propane, and butane, respectively; similarly, for the liquid phase, hexane, heptane, and octane components are shown by the mole numbers $N_{hx}$, $N_{hp}$, $N_{oct}$, respectively. In practice, more components may be generated in this manner, depending upon the components needed by surface model 12; for example, conventional surface models at operating locations may require as many as twenty component quantities to simulate the output from surface processing station 2, in which case twenty molar quantities, one for each component, will be determined at each internal volume cell boundary of reservoir model $R_m$. As noted above, the quantities of the various components provided by process 48 are expressed as moles so as to correspond to the actual mass of the individual components crossing each volume cell boundary, including the output from well W. System computer 30 performs this transformation upon each of the fluxes determined by process 46, for each of the volume cell boundaries, for time step $\Delta t$.

At the important boundary of the output of reservoir model $R_m$ from well volume cell $10_w$, the molar quantities determined in process 48 will correspond to the well output quantities WO from the reservoir over the time step $\Delta t$ of interest (e.g., one week's output). The molar quantities provided by process 48 as well output quantities WO may then be applied to the input of surface model 12, as these molar quantities will represent the mass of each component.

After completion of process 48, system computer 30 then performs an accounting procedure in process 50 to update the mass of each component within each volume cell 10 of reservoir model $R_m$. In this accounting procedure, system computer 30 will subtract, for each volume cell 10, the outgoing masses of each component from the prior volume, and add thereinto the incoming mass of each component. The accounting process of process 50 will also rationalize these masses with the overall phase quantities of the gases and liquids indicated by the black oil simulation to ensure reasonable coherence therebetween. Significant inconsistencies for a particular volume cell 10, such as negative masses and the like, will also be dealt with by system computer 30 in process 50 according to a previously established protocol for such adjustment. The coherence also indicates the applicability of the method to the specific reservoir R (i.e., indicates the extent to which reservoir R satisfies the weakly compositional assumption).

Upon completion of the accounting of process 50, decision 51 is determined by system computer 30 to decide whether additional time steps $\Delta t$ are to be performed in the simulation. As noted above, it is contemplated that typical simulation runs will cover long time periods, for example of fifty to sixty years, such that thousands of time steps $\Delta t$ will be run in each simulation, even where the time step $\Delta t$ corresponds to a relatively long time period such as a week.

It is highly preferred that the density values $\rho$ and other important fluid parameters for each of the components in the reservoir be adjusted periodically, given that material is flowing out of (and also possibly into) reservoir model $R_m$ over each time step $\Delta t$. This flow of gas and liquid may cause the pressure characteristics of each volume cell to also change which, according to any equation of state, will cause a change in the densities $\rho$ and other fluid parameters at that volume location. For example, if the local pressure at a volume cell 10 has changed significantly, the equation of state solution previously calculated may no longer provide a valid density value. Adjustment of densities $\rho$ may be accomplished simply by again applying the equation of state to each volume cell 10 to arrive at new density values $\rho$ after each time step $\Delta t$. However, computing time required may be minimized, according to the preferred embodiment of the invention, by again solving the equation of state only for those volume cells 10 that need adjustment, allowing those volume cells 10 that did not significantly change over time step $\Delta t$ to retain their previously solved density values $\rho$. For the example of the weakly compositional reservoir, for which the method according to the preferred embodiment of the invention is especially well suited, it has been observed that many of the volume cells 10 in reservoir model $R_m$ do not often require repetitive adjustment of the density values $\rho$, ensuring computational economy.

According to this preferred embodiment of the invention, therefore, if one or more additional time steps $\Delta t$ are to be simulated (i.e., decision 51 returns a YES), control passes to decision 53, in which system computer 30 analyzes the behavior of the characteristics of each volume cell 10 over the prior time step $\Delta t$. Particularly, system computer 30 determines whether the parameters of one or more volume cells 10 have changed to such a degree that at least one of its density values $\rho$ for a component may no longer be valid. System computer 30 may accomplish decision 53 by defining a list of threshold values for various parameters which, if exceeded, indicate that adjustment of density values $\rho$ should be performed; examples of these "exceptions" include excessive rate of pressure decline over one or more time steps $\Delta t$, excessive changes in volumetric throughput of one or more component over one or more time steps $\Delta t$, and more than a certain allowable mole fraction change in the quantity of one or more components within the volume cell over one or more most recent time steps $\Delta t$.

In the event that system computer 30 finds, in decision 53, that one or more of these "exceptions" has occurred for a volume cell 10 over the last time step $\Delta t$, control passes to process 54 to update the fluid parameters for the volume cells 10 that generated such exceptions. For those indicated volume cells 10, process 54 again solves that equation of state originally used to initialize the density values $\rho$ and other required fluid parameters, but at the temperature and pressure conditions currently entered for those volume cells 10. It is contemplated that many of the volume cells 10 in reservoir model $R_m$ may never need adjustment in their density values over the entire simulation of thousands of time steps $\Delta t$, while other volume cells 10 (such as those near or at injection site I) may require adjustment after each time step $\Delta t$ is simulated.

In either case, following the adjustment of process 54 or in the event that decision 53 returned a NO, process 56 is performed to increment time step $\Delta t$ to the next sample time window in the simulation, and process 46 is then performed again to operate the black oil simulation to determine the volume flux (in reservoir barrels) across each volume cell boundary, followed by process 48 in which the volume fluxes are transformed into mass fluxes by converting the volume flux into mole quantities, in the manner described hereinabove. This process continues until such time as no additional time steps $\Delta t$ remain to be performed (i.e., decision 51 returns a NO), in which case the simulation method ends.

Upon completion of the process of FIG. 4, system computer 30 produces the desired report of the simulation, for example to printer 28 (FIG. 2). The operator of the production site at reservoir R can then make the usual economic forecast, use the information in the selection of the proper EOR technique, or make such other decisions as appropriate based upon the results of the simulation.

As a result of the present invention, therefore, significant improvements in the economy and accuracy of the reservoir simulation process are thus obtained. Proper coherence between the reservoir simulation output and the inputs required by conventional surface model simulations is provided by the present invention, without reliance upon assumptions that may have little validity outside the particular circumstances under which they were made. By using the material balance equation techniques of the black oil simulation to determine flows, while using equation of states to determine fluid properties such as density within each volume cell of the reservoir model, the present invention provides the benefits of determining the mass flow characteristics of the individual components of the reservoir contents, without requiring the cumbersome and expensive generation and operation of a fully-compositional reservoir model. Information having a high degree of accuracy is thus obtained at significantly lower cost, through use of the present invention. In addition, the present invention enables the integration of the reservoir simulation with the surface model simulation, further streamlining the operation and reducing the computational cost of the overall production simulation system.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a computer system to determine the hydrocarbon output of a subsurface reservoir in mass units for a plurality of components of the contents of the reservoir, the plurality of components comprising at least first and second liquid hydrocarbon components and first and second gaseous hydrocarbon components, comprising the steps of:

retrieving, from computer-readable memory, data corresponding to geometry of the reservoir;

generating a computer representation of the reservoir as a plurality of cells arranged adjacent to one another so as to have boundaries therebetween;

assigning temperature and pressure values to each of the cells;

associating, with each of the plurality of cells, a density value for each of the plurality of components in each of the vapor and liquid phases;

performing a black oil simulation to determine a vapor flux volume and a liquid flux volume across each of the boundaries of cells in the computer representation of the reservoir over a time step, wherein one of the boundaries of cells corresponds to the output from a well location of the reservoir;

after the performing step, for each of the plurality of boundaries, transforming the vapor flux volume and liquid flux volume into the mass quantity of each of the components using the density values associated with the corresponding cells; and repeating the performing and transforming steps for a series of time steps.

2. The method of claim 1, wherein each cell corresponds to a three-dimensional volume element of the reservoir.

3. The method of claim 1, further comprising:

after the transforming step, performing an accounting of the masses of each of the plurality of components within each cell after the time step, to ensure coherency with the black oil simulation.

4. The method of claim 3, wherein the associating step comprises solving an equation of state, using the temperature and pressure values assigned to each of the plurality of cells.

5. The method of claim 3, further comprising:

after the step of performing an accounting, repeating the step of solving an equation of state for each of the plurality of cells to adjust the density values for each of the plurality of cells.

6. The method of claim 4, further comprising:

after the step of performing an accounting, identifying those of the plurality of cells for which the density values are likely to have changed over the time step; and repeating the step of solving an equation of state for each of the plurality of cells identified in the identifying step, to adjust the density values therefor.

7. The method of claim 1, wherein the plurality of components comprises methane, ethane, and propane.

8. The method of claim 1, further comprising:

after the transforming step, applying the mass quantities of each of the plurality of components corresponding to the output from the well location of the reservoir to a surface model simulation.

9. The method of claim 1, wherein one of the boundaries of cells corresponds to the input into an injection location of the reservoir.

10. A computer system for determining the hydrocarbon output of a subsurface reservoir in mass units for a plurality of components of the contents of the reservoir, the plurality of components comprising at least first and second liquid hydrocarbon components and first and second gaseous hydrocarbon components, comprising:

a computer-readable memory, for storing data corresponding to the geometry of a sub-surface reservoir, and to pressure and temperature values at locations in the reservoir;

an output device; and a computer programmed to perform a sequence of steps comprising:

retrieving, from computer-readable memory, data corresponding to geometry of the reservoir;

generating a computer representation of the reservoir as a plurality of cells arranged adjacent to one another so as to have boundaries therebetween;

assigning temperature and pressure values to each of the cells;

associating, with each of the plurality of cells, a density value for each of the plurality of components in each of the vapor and liquid phases;

performing a black oil simulation to determine a vapor flux volume and a liquid flux volume across each of the boundaries of cells in the computer representation of the reservoir over a time step, wherein one of the boundaries of cells corresponds to the output from a well location of the reservoir;

after the performing step, for each of the plurality of boundaries, transforming the vapor flux volume and liquid flux volume into the mass quantity of each of the components using the density values associated with the corresponding cells; and repeating the performing and transforming steps for a series of time steps; and presenting to the output device a report indicating the results of the performing and transforming steps over the series of time steps.

11. The system of claim 10, wherein each cell corresponds to a three-dimensional volume element of the reservoir.

12. The system of claim 10, wherein the sequence of steps further comprises:

after the transforming step, performing an accounting of the masses of each of the plurality of components within each cell after the time step, to ensure coherency with the black oil simulation.

13. The system of claim 12, wherein the associating step comprises solving an equation of state, using the temperature and pressure values assigned to each of the plurality of cells.

14. The system of claim 12, wherein the sequence of steps further comprises:

after the step of performing an accounting, repeating the step of solving an equation of state for each of the plurality of cells to adjust the density values for each of the plurality of cells.

15. The system of claim 10, wherein the sequence of steps further comprises:

after the step of performing an accounting, identifying those of the plurality of cells for which the density values are likely to have changed over the time step; and repeating the step of solving an equation of state for each of the plurality of cells identified in the identifying step, to adjust the density values therefor.

16. The system of claim 10, wherein the sequence of steps further comprises:

after the transforming step, applying the mass quantities of each of the plurality of components corresponding to the output from the well location of the reservoir to a surface model simulation.

17. A computer-readable memory configured so that, when read and used by a computer, the computer is directed to determine the hydrocarbon output of a subsurface reservoir in mass units for a plurality of components of the contents of the reservoir, the plurality of components comprising at least first and second liquid hydrocarbon components and first and second gaseous hydrocarbon components, said computer directed by a plurality of operations comprising:

retrieving, from a computer-readable memory, data corresponding to geometry of the reservoir;

generating a computer representation of the reservoir as a plurality of cells arranged adjacent to one another so as to have boundaries therebetween;

assigning temperature and pressure values to each of the cells;

associating, with each of the plurality of cells, a density value for each of the plurality of components in each of the vapor and liquid phases;

performing a black oil simulation to determine a vapor flux volume and a liquid flux volume across each of the boundaries of cells in the computer representation of the reservoir over a time step, wherein one of the boundaries of cells corresponds to the output from a well location of the reservoir;

after the performing step, for each of the plurality of boundaries, transforming the vapor flux volume and liquid flux volume into the mass quantity of each of the components using the density values associated with the corresponding cells; and repeating the performing and transforming steps for a series of time steps.

18. The computer-readable memory of claim 17, wherein each cell corresponds to a three-dimensional volume element of the reservoir;

wherein the associating step comprises solving an equation of state, using the temperature and pressure values assigned to each of the plurality of cells and wherein the sequence of operations further comprises:

after the transforming step, performing an accounting of the masses of each component within each cell after the time step, to ensure coherency with the black oil simulation.

19. The computer-readable memory of claim 17, wherein the sequence of operations further comprises:

after the step of performing an accounting, identifying those of the plurality of cells for which the density values are likely to have changed over the time step; and repeating the step of solving an equation of state for each of the plurality of cells identified in the identifying step, to adjust the density values therefor.

* * * * *